US012226058B2

(12) United States Patent
Claessens

(10) Patent No.: US 12,226,058 B2
(45) Date of Patent: Feb. 18, 2025

(54) SOAP, SOAP HOLDER AND SOAP—SOAP HOLDER ASSEMBLY

(71) Applicant: Vincent Claessens, Villars-sous-Yens (CH)

(72) Inventor: Vincent Claessens, Villars-sous-Yens (CH)

( * ) Notice: Subject to any disclaimer, the term of this patent is extended or adjusted under 35 U.S.C. 154(b) by 622 days.

(21) Appl. No.: 17/429,226

(22) PCT Filed: Feb. 6, 2020

(86) PCT No.: PCT/EP2020/052954
§ 371 (c)(1),
(2) Date: Aug. 6, 2021

(87) PCT Pub. No.: WO2020/161222
PCT Pub. Date: Aug. 13, 2020

(65) Prior Publication Data

US 2022/0133094 A1 May 5, 2022

(30) Foreign Application Priority Data

Feb. 6, 2019 (EP) .................................... 19155721

(51) Int. Cl.
*A47K 5/05* (2006.01)
*A47K 5/08* (2006.01)
(Continued)

(52) U.S. Cl.
CPC .................. *A47K 5/05* (2013.01); *A47K 5/08* (2013.01); *A47K 7/028* (2013.01); *A47K 7/03* (2013.01);
(Continued)

(58) Field of Classification Search
CPC . A47K 5/05; A47K 5/08; A47K 7/028; A47K 7/03; A47K 7/043; C11D 17/006; C11D 17/046
See application file for complete search history.

(56) References Cited

U.S. PATENT DOCUMENTS 1,617,466 A 2/1927 Tronstad
3,192,894 A 7/1965 Staver
(Continued)

FOREIGN PATENT DOCUMENTS

DE 91 14 841 2/1992
FR 1 045 958 12/1953
(Continued)

OTHER PUBLICATIONS

Written Opinion cited in Application No. PCT/EP2020/075756 dated Oct. 15, 2020.
(Continued)

*Primary Examiner* — Jennifer C Chiang
(74) *Attorney, Agent, or Firm* — DLA Piper LLP (US)

(57) ABSTRACT

A soap holder for holding at least one bar of soap having at least one cleaning surface, a holding face and at least one lug projecting from said holding face, the soap holder comprising at least one contact face intended to be in contact with the holding face of the soap, a handling surface arranged to be held by a user, and at least one housing opening into said contact face, wherein said at least one housing is configured to receive said corresponding lug of the soap. The housing of the soap holder is arranged to allow said soap lug to be removably introduced into the housing. The invention also relates to a bar of soap suitable for the holder soap bars described above and intended for use on such a holder, as well as an assembly comprising a holder and at least one bar of soap.

8 Claims, 7 Drawing Sheets

(51) Int. Cl.

| | |
|---|---|
| ***A47K 7/02*** | (2006.01) |
| ***A47K 7/03*** | (2006.01) |
| ***A47K 7/04*** | (2006.01) |
| ***C11D 17/00*** | (2006.01) |
| ***C11D 17/04*** | (2006.01) |

(52) U.S. Cl.
CPC ............ *A47K 7/043* (2013.01); *C11D 17/006* (2013.01); *C11D 17/046* (2013.01)

(56) References Cited

U.S. PATENT DOCUMENTS

| | | | | |
|---|---|---|---|---|
| 3,498,726 | A | 3/1970 | Schwartz | |
| 4,335,007 | A | 6/1982 | Owens | |
| 8,303,203 | B2 * | 11/2012 | Bahash | A47K 5/08 510/148 |
| 10,112,758 | B2 * | 10/2018 | Beyer | C11D 17/04 |
| 10,278,551 | B2 * | 5/2019 | Jenkins | A61Q 19/10 |
| 11,071,414 | B2 * | 7/2021 | Jenkins | A47K 7/03 |
| 2017/0318820 | A1 | 11/2017 | Lim et al. | |

FOREIGN PATENT DOCUMENTS

| | | |
|---|---|---|
| FR | 2 505 142 | 11/1982 |
| FR | 2 995 181 | 3/2014 |
| WO | WO 0165946 | 9/2001 |

OTHER PUBLICATIONS

International Search Report cited in Application No. PCT/EP2020/075756 dated Oct. 15, 2020.

* cited by examiner

SOAP, SOAP HOLDER AND SOAP—SOAP HOLDER ASSEMBLY

CROSS REFERENCE TO RELATED APPLICATIONS

This application is a U.S. National Stage Application of International Application No. PCT/EP2020/052954 filed Feb. 6, 2020, which claims priority from European Patent Application No. 19155721.4 filed Feb. 6, 2019. The entirety of all the above-listed applications are incorporated herein by reference.

TECHNICAL FIELD

The invention relates to a soap holder, more particularly to a holder which can be held in one hand. The invention also relates to a bar of soap allowing a user to wash himself/herself, the soap being bar to be held by such a holder. The invention further relates to a soap—soap holder assembly. The holder is removable in the sense that it is not necessarily attached to a wall, for example.

PRIOR ART

For a number of years, solid soap allowing a user to wash himself or herself has been largely replaced by liquid soap and other shower products. Such liquid soaps avoid the problems and inconveniences of solid soaps for personal use which are very slippery and which have the annoying tendency to slip out of the user's hands, especially as the soap wears out, which is disturbing in terms of efficiency and practicality and may even cause accidents. In addition, these soaps soften and become sticky on contact with the area where they are stored, often wet, after use. Liquid soaps do not present these disadvantages and this risk.

Replacing solid soap with liquid soap, however, poses a number of problems. On the one hand, the fact that the soap is liquid implies that it must be packaged in a container. This container, generally made of plastic, contributes to pollution during its manufacture and during its disposal. Keeping soap in a liquid state involves the use of chemicals that can cause skin problems for the user. The amount of liquid soap used for one wash is much greater than the amount of solid soap for the same wash. A significant part of the liquid soap does indeed flow directly into the sewers before it has even been used.

A large number of attempts have been made to avoid the aforementioned problems associated with solid soaps, these attempts in particular seeking to prevent the soap from slipping out of the user's hands.

Among these attempts, U.S. Pat. No. 1,617,466 describes a handle for allowing an object that is relatively heavy to float on water. More specifically, the handle is used to float a bar of soap on water. The handle is made from an elastic material and has a hollow area that is inserted into the soap. The contact surface between the soap and the handle is relatively small.

U.S. Pat. No. 3,192,894 discloses a holder for an article made of a material which wears out, such as a soap bar. The holder includes a handle which has a male part which is inserted into a female part in the soap. The handle has protrusions that are used to hold the soap in place. The handle is not designed to be held in the hand, but rather to hang the soap on a fixed and solid object such as a hook for hanging soap, with its usable surface pointing either up or down.

U.S. Pat. No. 4,335,007 describes a holder comprising hollow elements such as dovetail grooves or spherical cavities. A soap bar is fashioned using a mold during the manufacture of the soap, the mold containing the holder. The soap being liquid or mushy during its manufacture, it flows into the hollow elements of the holder and fills them. When the soap dries, it solidifies, and the parts of the soap contained in the hollow elements of the holder allow the soap to be held on the holder.

Such a soap—soap holder assembly has a significant drawback. In fact, the soap must be made integral with the holder when the soap is manufactured. Therefore, the holder cannot be reused when the soap attached to it has been consumed. It is therefore a single use holder. In addition, the holder comprises zones having sharp or acute angles, these zones being in particular the zones in which the hollow elements of the holder open into the surface of the holder. On the one hand, the soap that is in the hollow areas of the holder cannot be used and is wasted. On the other hand, these sharp angles can be unpleasant for the user and cause injury or inconvenience when the soap is practically consumed, and some sharp angles are no longer covered by the soap.

The state of the art comprises numerous holder assemblys in which a connecting element is introduced into the soap and into a support or a handle, so as to bind these two components. This implies that the binding element should be introduced into the soap, if possible, at the time of soap manufacturing.

Other holders exist, these holders comprising an element which holds the soap in the holder, in particular, in a housing of the holder. This element may have claws or other protrusions, which could touch or even injure the user's skin when the soap has been subjected to a certain amount of wear. In addition, the part of the soap that is held between the claws or protuberances is usually lost and discarded.

U.S. Pat. No. 3,498,726 describes, for example, a holder containing four rods introduced into the soap. These rods are unpleasant for the user and simply render the holder unusable in practice once the soap has reached a certain level of wear.

There is therefore a need for a holder for a solid bar of soap for personal use which fulfills the following conditions:

- the holder must allow for the bar of soap to be held in a simple and effective manner, without it slipping out of the user's hands;
- the holder must allow for the soap to be completely used up as possible or at least to be as completely used up as possible, without waste;
- the holder must not injure the user; and
- the bar of soap must be able to be made integral with the holder after the soap has been manufactured, that is to say when the soap is hard, so as to make the holder reusable when the soap is used up.

SUMMARY OF THE INVENTION

The present invention proposes to provide a soap holder, a bar of soap and a soap bar—soap holder assembly which allows a user to wash or to use a solid bar of soap, without the latter running the risk of escaping from his or her hands. In addition, the holder is reusable with a new soap bar when an old soap bar has been consumed, which means that it is not necessary for the soap to be poured onto the holder during its manufacture, but that it can be put in place at any time.

The object of the present invention is achieved by a soap holder intended to retain at least one bar of soap having at least one cleaning surface, a holding face and at least one lug protruding from the holding face, said soap holder comprising at least one contact face intended to be in contact with the holding face of the soap bar, and a handling surface designed to be held by a user, the soap holder comprising at least one housing opening into said contact face, said at least one housing being configured to receive said corresponding soap lug, said soap holder being characterized in that said housing is arranged to allow said soap lug to be removably introduced into the housing.

The object of the invention is also achieved by a bar of soap comprising at least one cleaning surface arranged to be in contact with a body to be cleaned during the use of the soap, a holding face arranged to be in contact with a soap holder and at least one lug emerging from the holding face, the bar of soap being characterized in that said at least one lug is configured to be able to be inserted in a removable manner into a corresponding housing of said soap holder.

This object is further achieved by a soap—soap holder assembly formed by a soap holder and at least one bar of soap, said at least one bar of soap having at least one cleaning surface and one holding face comprising at least one lug opening opening out onto the holding face, said holder comprising at least one contact face designed to be in contact with the soap holding face, a handling surface designed to be held by a user and at least one housing opening into said contact face, the soap—soap holder assembly being characterized in that said at least one lug is configured to be able to be inserted in a removable manner into a corresponding housing of said soap holder.

According to the invention, the soap holder serves as a handle which can be held in one hand and which serves to hold the soap without it slipping. The holder greatly facilitates the holding of the soap in the hand, especially when it is wet and worn. The maintenance of the soap bar on the soap holder is carried out in a simple and efficient manner without tools and without complex handling.

The soap holder-soap assembly comprises a bar soap having a shape which allows the soap bar to be placed in a position which leaves at least one surface of the bar of soap exposed so that it can be in contact with the skin of a user, and a holder which has a part that comes into contact with the soap and a part that can be held without slipping in a user's hand. The holder retains the soap in a completely surprising and unexpected way.

The invention allows a user to use the soap even when the latter soap arrives flush with the holder without risking being injured or disturbed by sharp angles formed by hollow elements such as grooves or recesses or by protruding elements such as spikes, claws or protuberances which would serve to retain the soap in the holder. The soap and holder are configured so that some of the soap goes into a hole or recess in the holder. In one embodiment, when the soap is consumed and when only the remaining portion is that which is retained in the housing, this last piece of the soap can be used as a bar of soap. In another embodiment the last piece of soap can be removed from the housing and added to a new soap, which new soap has a "female" housing of the same shape as the remaining piece of the used soap. All of the embodiments allow the user to use the soap without it slipping in the hand, even when it is worn and wet, and this until it is completely or almost completely worn.

The invention allows very simple installation and replacement of the soap on its holder, without any special tool or any other system or added fixing part, and this, completely independent of the time of soap production. In other words, the soap does not contain any foreign part that should be connected to the holder and the soap does not need to be attached to the holder during the manufacturing of this soap.

Positioning a soap on the holder is extremely simple and holding the soap on the holder is surprisingly effective, regardless of soap wear.

BRIEF DESCRIPTION OF THE DRAWINGS

The present invention and its advantages will be better understood thanks to the detailed description which follows, with reference to the enclosed figures, in which.

DETAILED DESCRIPTION OF THE INVENTION

Several embodiments of the invention are described. References consisting of a number followed by a letter relate to a specific embodiment of an element of the invention. Similar elements of different embodiments of the invention have the same reference number, this reference number being followed by a different letter for different embodiments. Where an item is followed in the description by a reference number without a letter, the text relates to the item described, regardless of the specific embodiment. When an element is followed in the description by a reference number with a letter, the text relates to the element described according to the specific embodiment.

Figure 1:
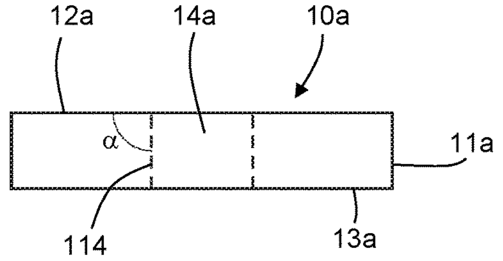
FIG. 1 illustrates a first embodiment of a soap holder according to the invention, seen in profile.
Figure 2:
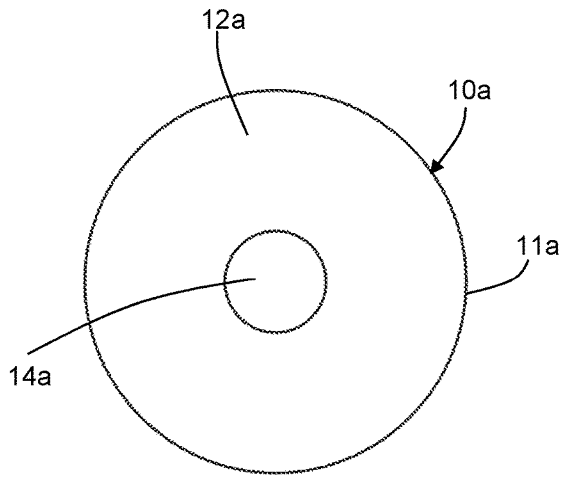
FIG. 2 shows the soap holder of FIG. 1, seen from above.

FIGS. 1 and 2 illustrate a first embodiment of a soap holder 10*a* according to the present invention. The soap holder 10*a* has the shape of a portion of a cylinder having two circular faces, connected by a handling surface 11*a*. One of the faces of the soap holder forms a contact face 12*a*, the function of which is explained below. The holder has an opposite face 13*a*, which is opposite the contact face 12*a*.

The soap holder 10*a* further comprises a female housing 14*a* made in the form of a hole passing through the holder 10*a* and opening out on the one hand into the contact face 12*a* and on the other hand into the opposite face 13*a* opposite the contact face 12*a*.

FIG. 2 is a plan view of the soap holder 10*a* illustrated in FIG. 1. The female housing 14*a* is visible, this housing 14*a* passing through the holder 10*a* from the contact face 12*a* to the opposite face 13*a*.

The housing 14*a* is delimited by a wall 114 forming an intersection with the contact face 12*a*. The wall 114 of the housing 14*a* and the contact face 12*a* define an angle α at their intersection, this angle α being on the side of the holder in which there is material and not on the void side of the housing, as illustrated in FIG. 1 in particular. This angle α is not acute, that is to say obtuse or right. In the illustrated embodiments, this angle is equal to 90°. As mentioned above, however, it could also be obtuse. Furthermore, the housing 12*a* does not include an "overhanging" element, that is to say elements of the housing whose projection on the contact face 12*a* would extend further than the opening of the housing 14*a* in the contact face 12*a* towards the handling surface 11*a* or the periphery of the holder, or would be larger than this opening of the housing.

The absence of any acute angles and overhangs offers two advantages. On the one hand, an acute angle can be unpleasant for the user and cause discomfort or even injury when this angle becomes accessible to the user, that is to say when the soap has reached a certain degree of wear. On the other hand, the lack of overhang allows new soap to be placed on the holder when an old soap has been consumed. This therefore makes it possible to reuse the holder. Indeed, the presence of an overhang implies that the soap must be fixed to the holder while the soap is still mushy, that is to say during its manufacture. As new soap is in principle solid, it cannot be placed in a holder, the latter therefore not being reusable. On the contrary, in the absence of an overhanging zone, it is possible to move the soap in a general movement perpendicular to the contact surface 12*a*, without this overhanging element retaining the soap. In this way, the soap can be seen as being able to be removably placed on the holder.

The soap holder 10*a*, and more specifically the handling surface 11*a*, is intended to be held by a user when he or she wishes to use a soap held on the holder 10*a*. For this purpose, the diameter and the height of the holder 10*a* are such that the holder can be held and handled easily.

Figure 3:
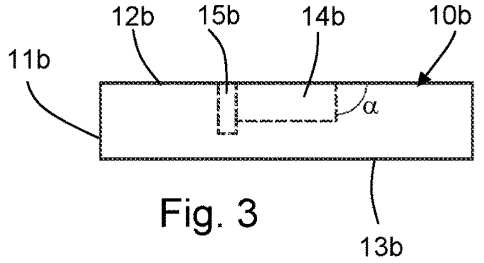
FIG. 3 shows a second embodiment of a soap holder, seen in profile.
Figure 4:
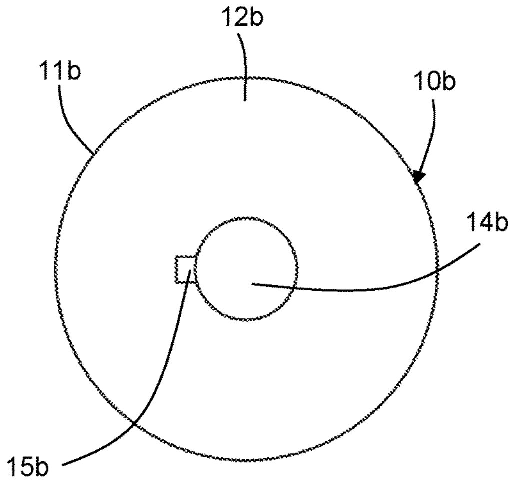
FIG. 4 illustrates the soap holder of FIG. 3, seen from above.

FIGS. 3 and 4 show a second embodiment of a holder 10*b* according to the invention. This embodiment is similar to the embodiment of FIGS. 1 and 2, except for the part related to the housing. The housing 14*b* of the embodiment of FIGS. 3 and 4 comprises a blind hole, which opens into the contact face 12*b* of the soap holder 10*b*. The housing 14*b* further comprises a groove 15*b* in communication with the blind hole and designed to receive a tool for extracting any remaining soap.

As in the previous embodiment, the wall of the housing forms a non-acute angle α with the contact face of the holder so that this housing does not form a sharp angle or have an overhanging element.

FIGS. 5 to 11 illustrate different embodiments of soap bars 20 according to the present invention, compatible with a soap holder 10 according to FIGS. 1 to 4. These soap bars 20 all include a cleaning surface 21 intended to be in contact with a body to clean. These soap bars further comprise a retaining face 22 arranged to be in contact with the contact face 12 of the soap holder 10 and to maintain the soap bar 20 on the soap holder 10.

Each bar of soap also comprises a male lug 23 which has a complementary shape and/or is adapted to the female housing 14 of the soap holder 10.

When a bar of soap 20 is to be mounted on a soap holder 10, the male lug 23 in the soap bar is inserted into the female housing 14 of the soap holder. The retaining face 22 of the bar of soap 20 is pressed against the contact face 12 of the soap holder 10. This has the effect of maintaining the soap on the holder, possibly by a suction effect, and of reinforcing the stability of the soap on the holder. Due to the relatively large contact surface between the contact face 12 of the holder and the retaining face 22 of the bar of soap and due to the presence of a lug 23 serving for holding and guiding, no further fastening element is necessary for the soap 20 to be held on the holder 10. Surprisingly, it suffices to wet or dampen the soap 20 and to press it against the holder 10 for the soap to hold on the holder. This method of attachment in which the soap is not retained by a housing whose walls form an acute angle with the contact face 12 or whose housing forms an overhang or in which protrusions are introduced into the soap, goes against all the soap holders which have been developed and goes against what is generally accepted and considered to be obvious and essential by those skilled in the art.

Figure 29:
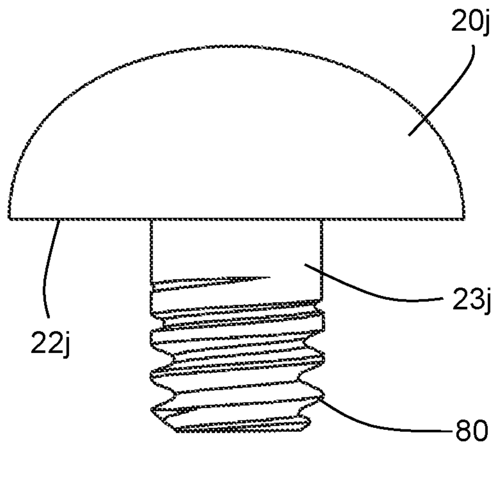
FIG. 29 is a side view of another embodiment of the bar of soap of the invention.
Figure 30:
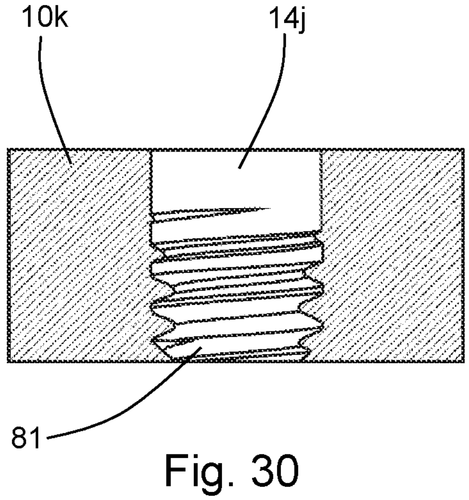
FIG. 30 is a sectional view of a soap holder usable with the bar of soap shown in FIG. 29.
Figure 31:
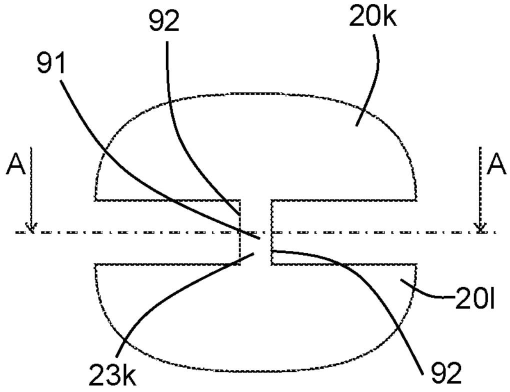
FIG. 31 is a side view of another embodiment of a bar of soap according to the present invention.
Figure 32:
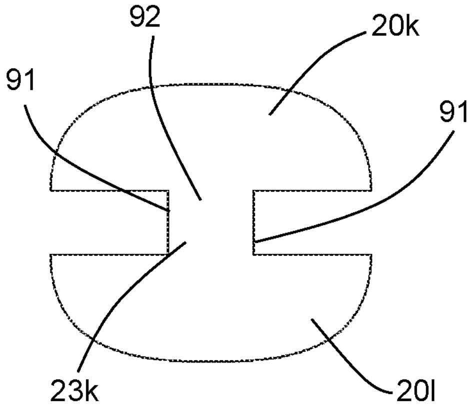
FIG. 32 is a side view of the bar of soap of FIG. 31, rotated 90° relative to the view of FIG. 31.
Figure 33:
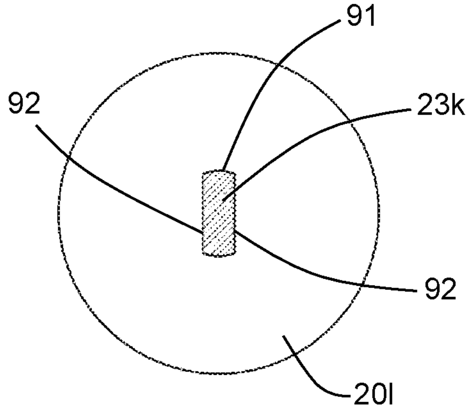
FIG. 33 is a sectional view along the axis A-A of FIG. 31.
Figure 34:
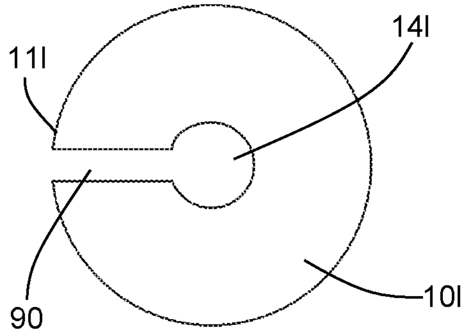
FIG. 34 is a top view of a soap holder usable with the bars of soap of FIGS. 31 to 33.
Figure 35:
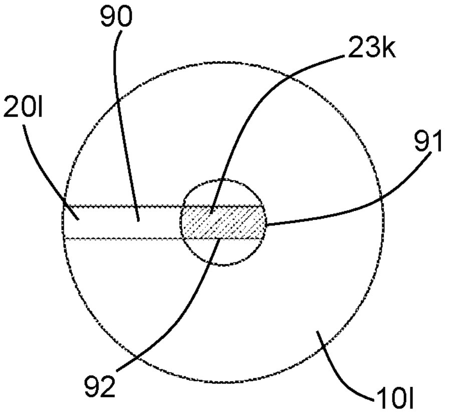
FIG. 35 is a view of the holder of FIG. 33 with a bar of soap partially in section, placed in the holder in a first position called the insertion position.
Figure 36:
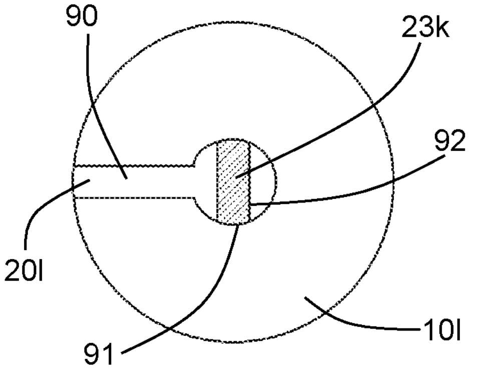
FIG. 36 is a view similar to FIG. 35, with the bar of soap in a second position, called the locking position.

In all of the illustrated embodiments, apart from that illustrated by FIGS. 29 and 30, the lug 23 has a cylindrical shape. The base of this cylinder forming the lug can be circular, but it can also be partially circular, rectangular or any other shape. The generator of the cylinder is in principle perpendicular to the holding face 22 of the soap.

Figure 5:
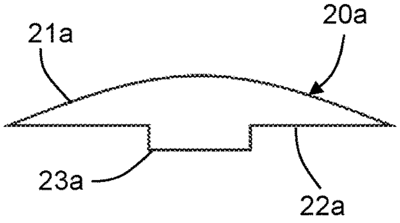
FIGS. 5 to 8 show different possible embodiments of bars of soap, seen in profile, suitable for the soap holders of FIGS. 1 to 4 in particular.

In the embodiment illustrated in FIG. 5, the soap 20*a* has a cleaning surface 21*a*, that is to say a surface in contact with the user, curved so as not to present angles which could be unpleasant for the user.

Figure 6:
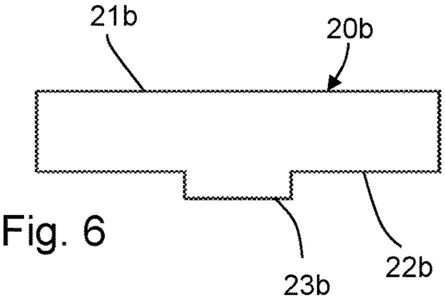

In the embodiment of FIG. 6, the soap 20*b* has a cylindrical shape, with a rectangular cross section. This allows for a soap bar having a greater amount of material than the soap bar of FIG. 5, but the soap bar 20*b* has a sharp angle which may be unpleasant for the user, at least at the beginning of the us of a new bar of soap.

Figure 7:
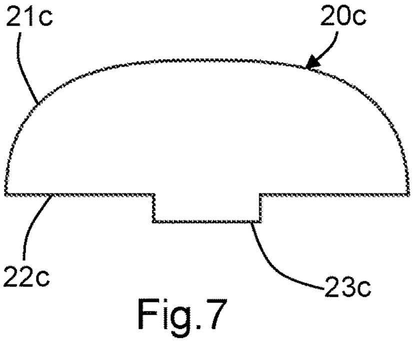

The bar of soap 20*c* of FIG. 7 combines the advantages of the bars of soap of FIGS. 5 and 6. It has a large quantity of material without having sharp angles which are unpleasant for the user.

Figure 8:
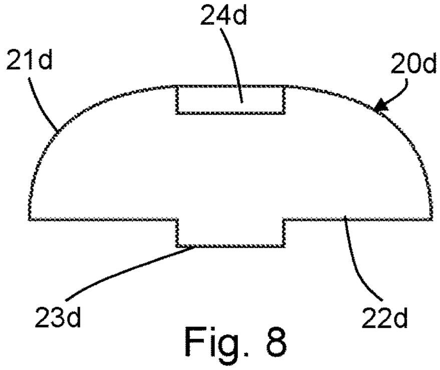

The bar of soap 20*d* illustrated in FIG. 8 comprises, in its cleaning surface 21*d*, a recess 24*d* having a shape and a dimension substantially identical to the shape and dimensions of the lug 23*d*. This recess 24*d* is also visible in FIG. 9 which is a top view of the bar of soap 20*d* of FIG. 8.

Figure 10:
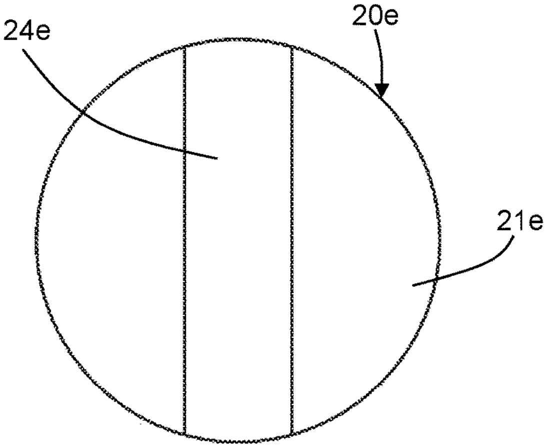
FIG. 10 is a top view of a variant of a bar of soap according to the invention.

FIG. 10 is also a top view of a bar of soap 20*e* according to the invention, comprising a recess 24*e* intended to receive the remainder of a used bar of soap. In the embodiment illustrated by this figure, the recess 24*e* has the shape of a groove.

When a bar of soap 20 and a soap holder 10 according to the invention are used, the soap 20 wears out until it comes flush with the holder 10. At this time, only the part of the soap placed in the housing remains, namely the lug 23. In the case where the housing 14*a* has a through hole, as illustrated for example in FIGS. 1 and 2, the remaining soap is pressed outside this housing 14*a* by the opposite face 13*a* to the contact face 12*a*. In the case where the housing 14*b* has a blind hole, as illustrated in FIGS. 3 and 4, a remainder of soap corresponding to the lug 23 is extracted from the holder 10 by introducing an extraction tool such as a stick or a screwdriver into the groove 15*b*.

The remaining soap can be used as a bar of soap, for example. In the case where the soap has a recess 24 adapted to the shape of the lug 23, as illustrated in FIGS. 8 to 11, the remaining soap corresponding to a lug 23*f* of an old soap can be introduced into the recess 24 of a new soap, which avoids any waste.

Figure 9:
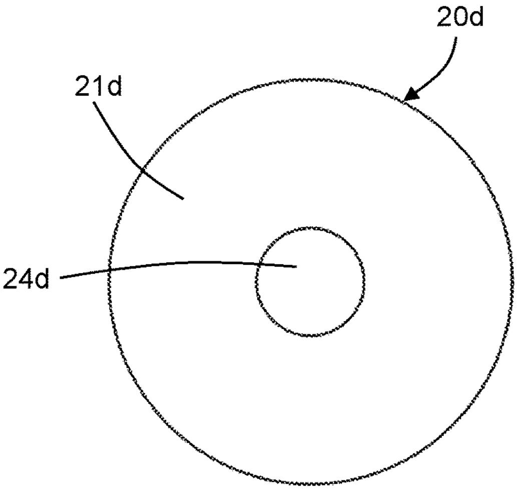
FIG. 9 is a top view of the bar of soap illustrated in FIG. 8.
Figure 11:
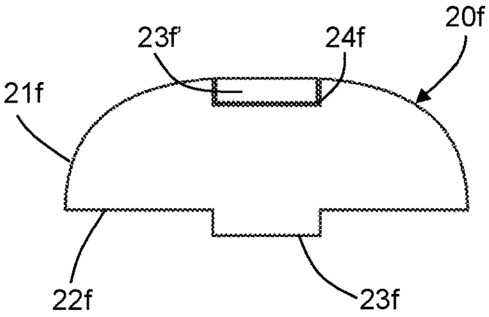
FIG. 11 is a side view of a bar of soap in which a remnant of an old bar of soap has been placed in a new bar of soap.

FIG. 11 illustrates a soap according to the embodiment of FIG. 8, 9 or 10, in which a lug 23*f* of an old soap has been introduced into a recess 24*f* of a new soap. Due to the properties of moistened soap, in particular the fact that soap can be slightly deformed and stuck by simple humidification, it is simple to position the lug of an old bar of soap into the recess of a new bar of soap and to hold the two bars of soap together, thus avoiding any waste.

Figure 12:
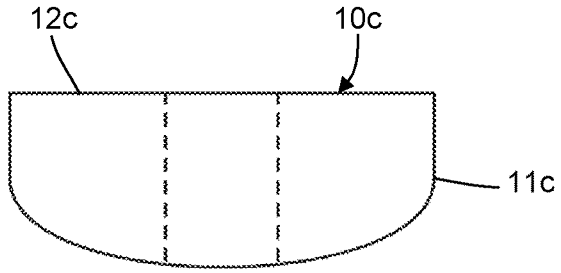
FIGS. 12 to 14 illustrate different alternative forms of holders for soap bars, seen in profile.
Figure 13:
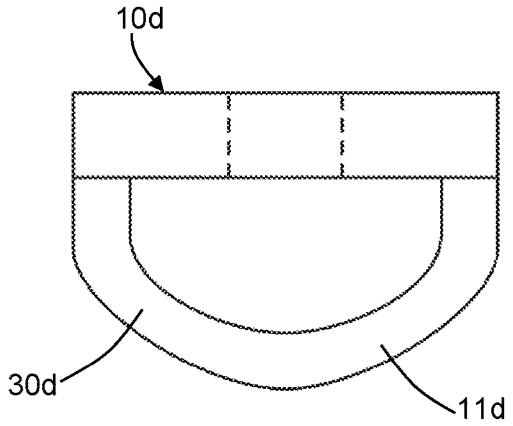

FIGS. 12 and 13 show two soap holders 10 having different shapes. In FIG. 12, the soap holder 10*c* has a planar contact face 12*c*, as in the embodiments of FIGS. 1 to 4. The handling surface 11*c* has a shape of a portion of a sphere or a shape similar to a portion of a sphere, so that this holder can be held in the hand of a user in a manner that is comfortable for the user.

FIG. 13 illustrates a soap holder 10*d* similar to that of FIGS. 1 and 2, to which a handle 30*d* or a loop has been added. This handle 30*d* is designed to be able to easily hold the holder 10*d* in the hand and acts as a handling surface 11*d*.

According to different possible variants, the handling surface 11 could have a shape chosen from a loop, a handle, a disc, a portion of a disc, a cylinder, a cylindrical strip, a portion of a sphere or any other suitable shape.

Figure 14:
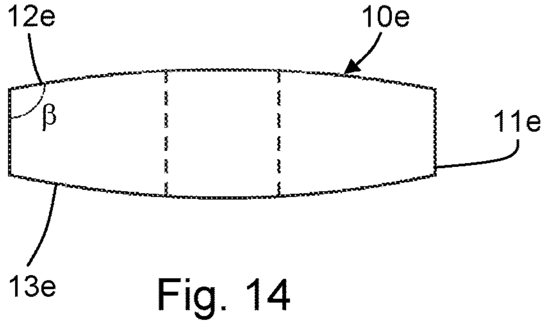
Figure 15:
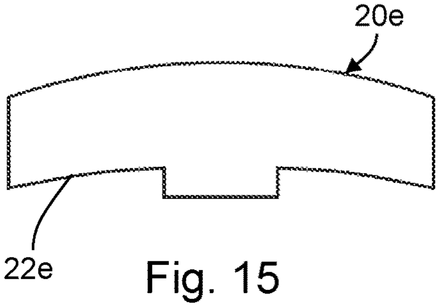
FIG. 15 shows a bar of soap compatible with the soap holder of FIG. 14.

FIGS. 14 and 15 respectively illustrate a soap holder 10*e* and a bar of soap 20*e* compatible with the holder. The soap holder 10*e* has a slightly domed contact face 12*e*, which is also the case for the opposite face 13*e*. In other words, the holder 10*e* has a slightly barrel-shaped cross section. In this case, the angle between the handling surface 11*e* and the tangent to the contact face 12*e* is an obtuse angle referenced to by the letter β in FIG. 14. Such an obtuse angle implies that there is no risk of injury or inconvenience upon contact of the soap holder 10*e* with the skin of the user when the soap 20*e* is almost completely consumed.

The bar of soap 20*e* of FIG. 15 is compatible for use with the holder 10*e* of FIG. 14. For this purpose, it has a retaining face 22*e* which is also curved, having a shape which is complementary to the contact face 12*e* of the holder 10*e*, so that the contact face 12*e* of the holder presses against the holding face 22*e* of the soap and such that the contact surface between the contact face 12*e* and the holding face 22*e* is relatively large.

Figure 16:
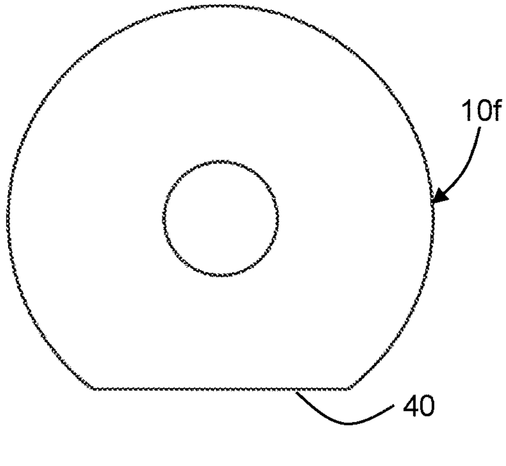
FIG. 16 shows a soap holder that can be placed on its edge.
Figure 17:
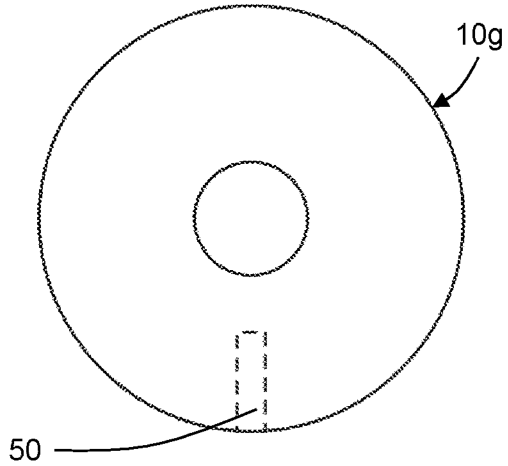
FIG. 17 shows a soap holder, seen from the front, designed to be held by a holding element such as a stand.

FIGS. 16 and 17 illustrate holders 10 having a resting area for allowing the holders to be placed in such a way that the soap does not rest on a wet or damp area and in such a way that these holders 10 do not roll.

To this end, the holder 10*f* of FIG. 16 comprises a flat zone 40 on which this holder 10*f* can be placed vertically. In this position, the soap remains in the air and dries without breaking up as is the case when the soap is simply placed in a conventional soap holder. In this embodiment, the diameter of the soap can be smaller than the diameter of the holder, or the soap can also have a dish, so that the soap does not protrude from the holder.

The holder 10*g* of FIG. 17 has a hole 50 provided to receive a rod of a holding element or foot (not shown). Also in this case, the soap stays in the air and does not fall apart. Such a medium can add an aesthetic effect to the whole.

Figure 18:
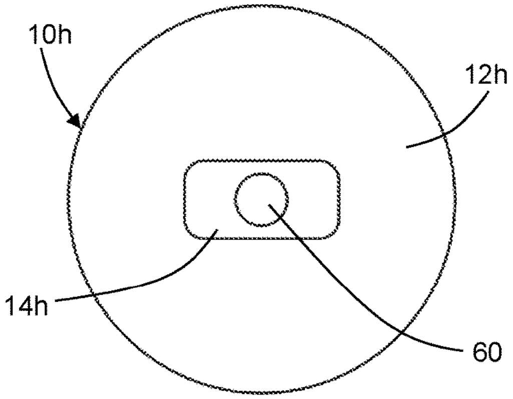
FIG. 18 is a top view of a particular embodiment of the holder according to the invention.
Figure 19:
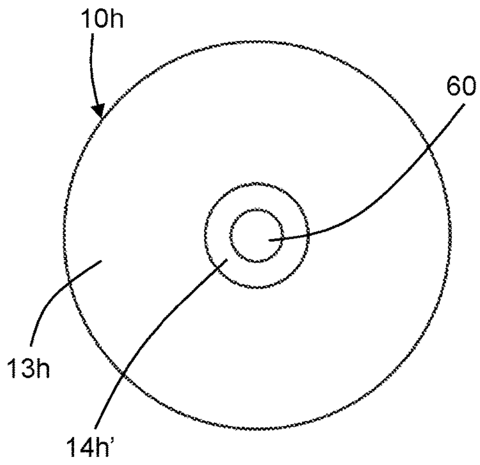
FIG. 19 is a bottom view of the embodiment of the holder of FIG. 18.
Figure 20:
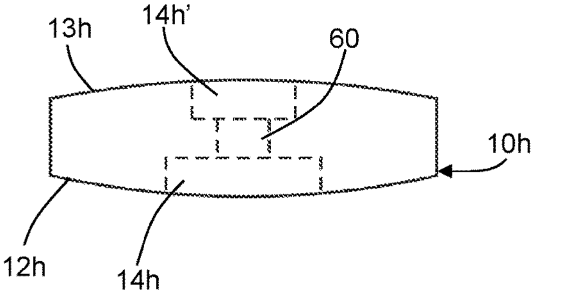
FIG. 20 is a side view of the embodiment of the holder of FIGS. 18 and 19.

FIGS. 18 and 19 show two opposite faces of the same 10*h* soap holder, this holder being illustrated in profile in FIG. 20. In this embodiment, a contact face 12*h* of the 10*h* soap holder comprises a female housing 14*h* intended to receive a male soap lug. This housing 14*h* has a cylindrical shape with a substantially rectangular base.

As illustrated in FIG. 19, the holder 10*h* comprises a face 13*h* opposite the contact face 12*h*, this opposite face also comprising a housing 14*h*'. This housing 14*h*' has a cylindrical shape with a circular base. The soap holder also has a through hole 60 connecting the two housings.

In this embodiment, a first bar of soap can be placed opposite the contact face 12*h* of the soap holder, while a second bar of soap can be placed on the opposite face 13*h*. The shape of the housings 14*h*, 14*h*' acts as a "foolproof" in the sense that a bar of soap whose lug 23 is provided to fit one of the housings of the holder can only be placed in this housing and not in the housing made in the opposite face.

Both bars of soap can be of identical composition and have an identical application. This can for example be the case with soap used for washing hands, where it makes sense for the two bars of soap to be the same. It is also conceivable to have different soaps, intended for different applications such as for example a bar of soap for the body of a user and a bar of soap for washing the hair. It is also possible to provide two bars of soap having in particular different compositions, scents or colors. The bars of soap can also be intended for two different people.

The through hole 60 connecting both housings makes it possible to easily remove the remaining tabs of the soap bars when they have been used up. As in the other embodiments, none of the housings has an overhanging area with respect to the opening of the corresponding housing. Thus, it is possible to introduce a bar of soap on the holder with a pin placed in the housing, while the soap is hard.

Figure 21:
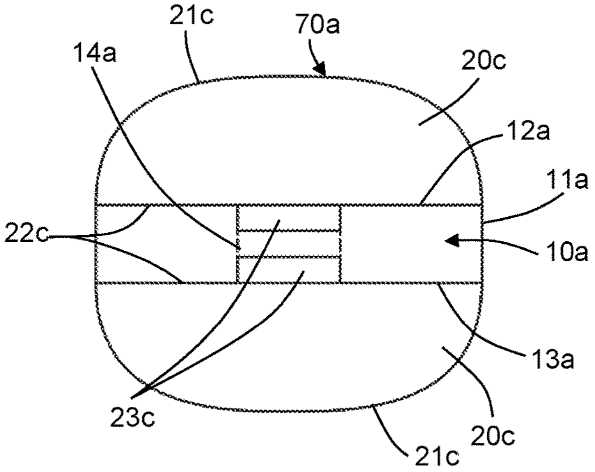
FIG. 21 shows a soap—soap holder assembly according to a first embodiment of the invention.

FIG. 21 illustrates an embodiment of a soap—soap holder assembly 70*a* in which a holder 10*a* as illustrated in FIG. 1 receives two bars of soap 20*c* as illustrated in FIG. 7.

In this soap—soap holder assembly 70*a*, the holding face 22*c* of each of the soap bars is in contact with the contact face 12*a* of the holder or with the face 13*a* opposite the contact face. The lug 23*c* of each bar of soap is placed in the housing 14*a* of the holder. The large contact surface between the holding and contact faces ensures good resistance of the soap bars on the holder. The handling surface 11*a* of the holder is easily accessible by the user and allows him or her to hold the soap—soap holder assembly firmly and conveniently, without the risk of the assembly escaping his or her hands.

The cleaning surface 21*c* of the soap bars is also easily accessible by the user, which allows him or her to use the soap easily. The only surface without soap is the handling surface 11*a*. On the one hand, when using the soap—soap holder assembly 70*a*, the handling surface is held by the user, which implies that there is little risk of it coming into contact with the parts of the body that the user cleans. On the other hand, even if this handling surface rubs the users body, it is soft and does not risk injuring the user.

Figure 22:
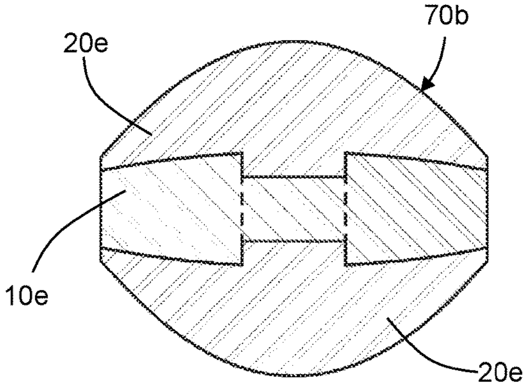
FIG. 22 is a sectional view of a variant of the soap—soap holder assembly according to the invention.

FIG. 22 is a sectional view of a soap—soap holder assembly 70*b* similar to the assembly 70*a* of FIG. 21. This assembly 70*b* is formed by a holder 10*e* as shown in FIG. 14 and two bars of soap 20*e* similar to the bar of soap in FIG. 15.

Figure 23:
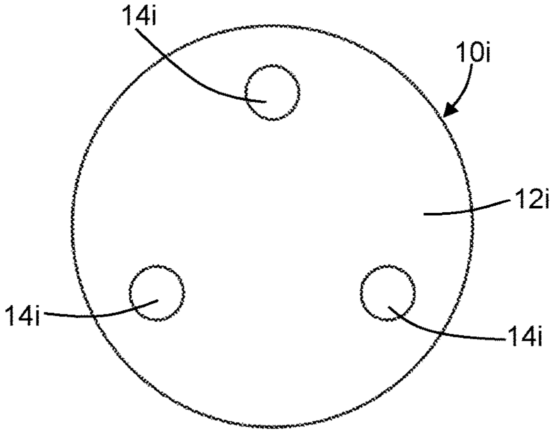
FIG. 23 is a top view of another particular embodiment of a soap holder according to the invention.
Figure 25:
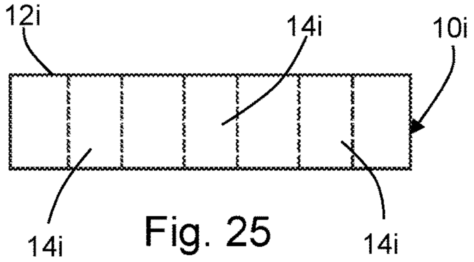
FIG. 25 is a side view of the holder of FIG. 23.

FIG. 23 represents a soap holder 10*i*, and more specifically its contact face 12*i*. In this embodiment, the central housing of the previous embodiments is replaced by several housings 14*i*, for example three housings arranged at different locations on the holder. These housings 14*i* can pass through, as can be seen in the profile view of the holder 10*i*, this profile view corresponding to FIG. 25.

Figure 24:
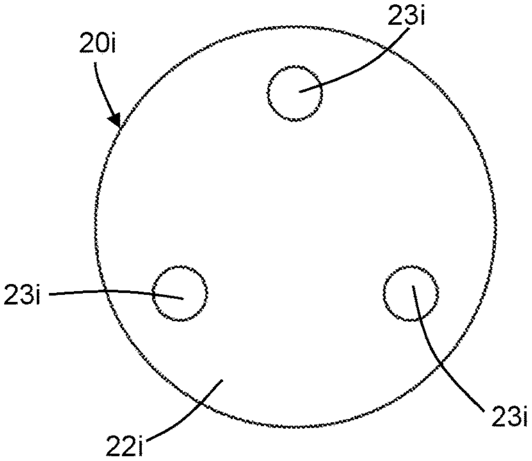
FIG. 24 is a bottom view of a soap compatible with the holder of FIG. 23.

FIG. 24 is a view of the holding face 22*i* of the soap 20*i* suitable for use in the holder 10*i* of FIG. 23. This bar of soap 20*i* comprises three lugs 23*i* positioned and dimensioned so as to be able to be placed in the housings 14*i* of the holder.

Figure 26:
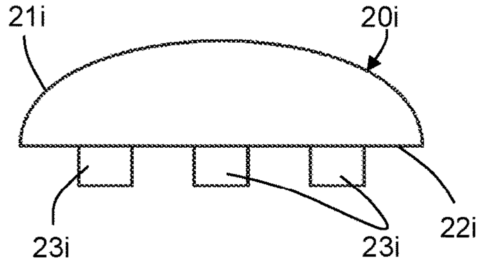
FIG. 26 is a side view of the soap of FIG. 24.

FIG. 26 is a side view of the soap 20*i* shown in FIG. 24.

It is clear that a number of housings and holders other than one or three could be used, as long as a bar of soap can be placed on a holder. According to a variant, the holder could have more housings than the soap has lugs. The bar of soap could for example have two lugs while the holder has three housings. As indicated above, it suffices for a bar of soap to be able to be held in place on a holder and therefore for the contact surface between the bar of soap and the holder to be large enough.

Figure 27:
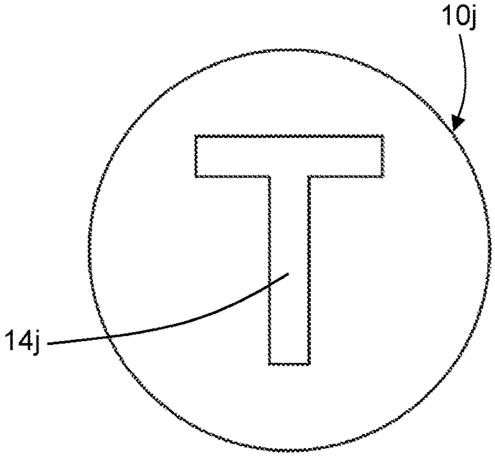
FIG. 27 is a top view of a soap holder, according to another embodiment of the invention.
Figure 28:
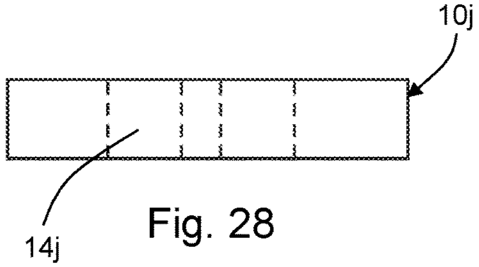
FIG. 28 is a side view of the soap holder of FIG. 27.

In the embodiment illustrated by FIGS. 27 and 28, the housing 14*j* of the holder 10*j* does not have a cylindrical shape with a circular base, but has a base having a shape which can be chosen, for example, by the manufacturer of the holder. This shape may correspond to a distinctive sign of the soap manufacturer or producer. It is clear that the soap has a lug having a corresponding shape, not necessarily identical, but such that the soap can be held on the holder.

This embodiment allows a company to affix a distinctive sign such as a trademark or any other appropriate form of its choice, on the one hand so that its soap and the corresponding holder are recognizable to the consumer and on the other hand, in order to link the holder to a particular brand of soap. For example, the company can offer a holder to its customers and ensure that they will only use its soap on the holder in question. It is also possible to associate a form of the base with a particular event such as for example a religious holiday, a media event or other.

The housing of the holder may be completely traverse the holder, as far as the logo allows, or it may partially traverse. In the latter case, it is advantageous to provide an extraction means to be able to remove the lug from the holder when the soap is consumed.

In the embodiment illustrated by FIGS. 29 and 30, the lug 23*j* of the bar of soap 20*j* comprises a thread 80. The housing 14*j* of the holder 10*k* comprises a threaded area 81 complementary to the thread 80 of the soap bar so that the soap 20*j* can be "screwed" into the 10*k* holder. This threaded zone, as well as the thread can be very short and can even be limited, for example, to a quarter of a turn. On the contrary, it can also extend over several turns. The axis of the thread 80 of the lug is in principle perpendicular to the holding face 22*j* of the soap.

Also in this embodiment, the bar of soap 20*j* can be mounted on the holder regardless of when the soap is manufactured, which means that the holder is reusable. In addition, no protruding or protruding element protrudes from the holder so that the user cannot be injured or be inconvenienced.

The remaining part of the lug 23*j* of the soap 20*j*, when the soap is used up, can be extracted from the holder by rotating this lug, for example by means of a screwdriver or a coin. This remaining part can also be placed in a recess provided for this purpose in a new bar of soap.

FIGS. 31 to 36 illustrate an embodiment in which two soap bars 20*k* are linked together by a lug 23*k* having a particular shape, cooperating with a holder 10*l* also having a particular shape. More precisely, as can be seen in particular in FIG. 34, the holder 10*l* comprises a housing 14*l* which is extended by a groove 90 opening into the handling surface 11*l*.

The lug 23*k* has a cylinder shape having a portion 91 of its base in the form of a portion of a circle with a diameter allowing the lug 23*k* to be placed in the housing 14*l* of the holder, and two flats 92 parallel and spaced apart so that the width of the lug 23*k* is less wide than the width of the groove 90.

In this embodiment, when the soap bar is to be introduced on a holder, the lug 23*k* is presented opposite the groove 90 so that this lug can be moved along the groove in the direction of the housing 14*l*. The position of the soap in relation to the holder is called the introduction position.

When the lug has been placed in the housing, the soap is pivoted so that the flats 92 of the lug are no longer in the extension of the groove 90, so that the lug 23*k* cannot come out of the housing 14*l*. This position corresponds to a so-called locking position.

Also in this embodiment, a new bar of soap can easily be placed on a holder when the soap is hard, i.e. regardless of when it was manufactured, making the holder reusable.

The absence of elements presenting claws, protrusions or forming a sharp or acute angle ensures that the holder does not risk injuring the user or causing discomfort or pain. The absence of overhanging elements also allows new soap to be placed on the holder, making the holder reusable.

When the soap bars are used up, only the lugs remain in the housings. These lugs can easily be extracted from the housings by simply pressing. The soap remaining from these lugs can be used as a small soap bar or be attached to a new bar of soap, as previously described. So no soap is wasted.

According to various embodiments of the invention, the soap holder can be made entirely or partially of wood, synthetic or biodegradable materials, or of virtually any water-resistant material.

The soap—soap holder assembly makes it possible to hold the bar or bars of soap easily and firmly, without the risk of the soap bar or soap bars slipping and escaping from the user's hands. The holder avoids any waste of soap and does not present a risk of injuring or inconveniencing the user. In addition, the holder can be reused easily to receive a new bar of soap. The holder allows the user to easily rest the soap holder assembly in a position such that the assembly does not rest on the soap. This would have the effect of leaving the soap in the humidity, the soap then disintegrating, sticking to the holder, in an unhygienic manner.

Several embodiments of the invention have been described. These embodiments are not, however, limiting. In particular, the combination of different characteristics from different embodiments is also included in the invention, as long as this combination is usable or achievable. The shape of the housing can be any as long as it allows a new soap to be placed when an old soap has been consumed. This implementation must be able to be done when the soap making is finished, when a user has acquired the soap and not during the manufacture of this soap.

In the illustrated embodiments, the holder has a circular shape when viewed from above. It is clear that other shapes are also possible. Among these shapes, there are in particular oval, ovoid, square, rectangular shapes, with rounded corners for example, but also all kinds of geometric shapes or even distinctive shapes, for example specific to a company.

The invention claimed is:

1. A bar of soap comprising:

at least one cleaning surface configured to be in contact with a body to be cleaned when using the soap;

a holding face configured to be in contact with a soap holder; and at least one lug projecting from the holding face, the at least one lug being configured to be inserted in a removable manner into a corresponding housing of the soap holder;

wherein the cleaning surface comprises at least one recess, the number of recesses, their shape and their dimensions corresponding to the number of lugs, to their shape and to their dimensions.

2. The bar of soap according to claim 1, wherein the recesses and the lugs are configured so that the lugs of one bar of soap can be inserted into the recesses of another identical bar of soap.

3. The bar of soap according to claim 1, wherein the lug has a cylindrical shape having a generatrix perpendicular to the holding face.

4. The bar of soap according to claim 1, wherein the lug has a thread having a thread axis perpendicular to the holding face.

5. A soap-soap holder assembly comprising:

a soap holder; and at least one bar of soap, the at least one bar of soap having at least one cleaning surface and a holding face comprising at least one lug projecting from the holding face;

the soap holder comprising at least one contact face intended to be in contact with the holding face of the bar of soap, a handling surface configured to be held by a user, and at least one housing opening into the contact face;

the at least one lug being configured to be inserted in a removable manner into a corresponding housing of the soap holder, wherein the cleaning surface comprises at least one recess, the number of recesses, their shape and their dimensions being identical to the number of lugs, to their shape and to their dimensions.

6. The soap-soap holder assembly according to claim 5, wherein the recesses and the lugs are configured so that the lugs of one bar of soap can be inserted into the recesses of another identical bar of soap.

7. The soap-soap holder assembly according to claim 5, wherein the assembly comprises a soap holder and two bars of soap.

8. The soap-soap holder assembly according to claim 7, wherein the housing of the soap holder has a through hole and wherein the lugs of the two soaps are disposed in the through hole.

* * * * *